(12) United States Patent
Kuboyama et al.

(10) Patent No.: US 12,305,285 B2
(45) Date of Patent: May 20, 2025

(54) RADIO WAVE TRANSMISSIVE METALLIC MEMBER AND METHOD FOR MANUFACTURING THE SAME

(71) Applicant: TOYOTA JIDOSHA KABUSHIKI KAISHA, Toyota (JP)

(72) Inventors: Daiki Kuboyama, Toyota (JP); Jyunya Murai, Nisshin (JP); Hiroki Nishijima, Nisshin (JP); Miwako Shionoya, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 250 days.

(21) Appl. No.: 18/191,524

(22) Filed: Mar. 28, 2023

(65) Prior Publication Data

US 2023/0332283 A1    Oct. 19, 2023

(30) Foreign Application Priority Data

Apr. 14, 2022  (JP) .................. 2022-066684

(51) Int. Cl.
  *C23C 18/52*  (2006.01)
  *H01Q 1/38*  (2006.01)
(52) U.S. Cl.
  CPC .............. *C23C 18/52* (2013.01); *H01Q 1/38* (2013.01)
(58) Field of Classification Search
  CPC . C23C 18/52; C23C 18/1641; C23C 18/1658; C23C 18/44; C23C 18/165; C23C 18/31; C23C 18/2066; C23C 18/28; C23C 18/34; C23C 18/40; H01Q 1/38; C08K 2201/013; B05D 5/06; B05D 1/38; B05D 1/005; B05D 1/18; C09D 7/62; C09D 7/66; C09D 7/80; C09D 5/36; C08J 7/0427; C08J 2369/00; C08J 2477/00
  See application file for complete search history.

(56) References Cited

U.S. PATENT DOCUMENTS

| | | | |
|---|---|---|---|
| 2016/0256891 A1* | 9/2016 | Yoshinaga | ................ B44C 1/10 |
| 2019/0275759 A1 | 9/2019 | Nishio et al. | |
| 2021/0299702 A1 | 9/2021 | Kuboyama et al. | |

FOREIGN PATENT DOCUMENTS

| | | | | |
|---|---|---|---|---|
| JP | 2007-71667 A | 3/2007 | | |
| JP | 2010-251899 A | 11/2010 | | |
| JP | 2015-51608 A | 3/2015 | | |
| JP | 2018-069462 A | 5/2018 | | |
| JP | 2021-155844 A | 10/2021 | | |
| WO | WO-2019208488 A1 * | 10/2019 | ........... | C23C 14/086 |

* cited by examiner

*Primary Examiner* — Seung H Lee
(74) *Attorney, Agent, or Firm* — Oliff PLC (57) ABSTRACT

The present disclosure provides a radio wave transmissive metallic member having an excellent metallic luster. The present disclosure relates to a metallic member and a method for manufacturing the same. The metallic member comprises a substrate body, an ion-exchange resin layer formed on the substrate body, and a metal particle layer formed on the ion-exchange resin layer, wherein metal particles having a high aspect ratio are longitudinally oriented with respect to the ion-exchange resin layer and the substrate body.

9 Claims, 4 Drawing Sheets

RADIO WAVE TRANSMISSIVE METALLIC MEMBER AND METHOD FOR MANUFACTURING THE SAME

CROSS REFERENCE TO RELATED APPLICATIONS

The present application claims priority from Japanese patent application JP 2022 066684 filed on Apr. 14, 2022, the entire content of which is hereby incorporated by reference into this application.

BACKGROUND

Technical Field

The present disclosure relates to a radio wave transmissive metallic member and a method for manufacturing the same.

Background Art

Since metallic members can provide metallic luster with high luminance on a surface of a product and add a high-quality appearance, the metallic members are used for various products. The metallic members are required to have various properties depending on the product to be used in addition to having the high metallic luster. One of the properties is a radio wave transparency. For example, a millimeter-wave radar mounted on an automobile or the like is a device that emits a radio wave in a millimeter waveband (radio wave having wavelength of 1 mm to 10 mm) and measures a time period until the radio wave returns after being reflected by an obstacle, thereby measuring a distance to the obstacle. When a metallic member is used for the millimeter-wave radar, the metallic member is required to be excellent in metallic luster and millimeter-wave transparency.

As a metallic member having radio wave transparency, for example, JP 2018 69462 A discloses a metallic lustrous member with electromagnetic wave transmissibility produced by sputtering a metal on a substrate to form a discontinuous film. However, since the sputtering is a process of vacuum batch, the cost increases.

JP 2010-251899 A discloses a method for manufacturing a metal composite material with electromagnetic wave transmissibility. The method comprises: forming a metallic coating on a resin substrate; and removing a part of the formed metallic coating to form metal regions in regular island shapes. JP 2010-251899 A discloses that forming the metallic coating is performed by sputtering or a vacuum evaporation method, and removing a part of the metallic coating is performed by masking and etching portions corresponding to the metal regions of metallic coating. However, this manufacturing method includes a large number of processes and is complicated, and furthermore, the management of the etching is difficult, thus it is difficult to obtain an intended structure.

JP 2021-155844 A discloses a metallic film produced by a method different from the sputtering or the evaporation.

However, in the metallic members produced by the conventional manufacturing methods, a metal film strongly absorbs a light of a specific wavelength in a visible light region due to an occurrence of a surface plasmon resonance, and the tone and the luster originally provided in the metal are deteriorated in some cases.

SUMMARY

As described above, in the conventional radio wave transmissive metallic members, the tone and the luster originally provided in the metal are deteriorated in some cases. Therefore, the present disclosure provides a radio wave transmissive metallic member excellent in metallic luster.

The inventors examined various means to solve the problem, and found that a metallic member excellent in both metallic luster and radio wave transparency without peculiar absorption in a visible light region can be obtained by longitudinally orienting metal particles having a high aspect ratio with respect to a substrate body. Thus the inventors completed the present disclosure.

That is, the gist of the present disclosure is as follows.

(1) A metallic member comprising: a substrate body; an ion-exchange resin layer formed on the substrate body; and a metal particle layer formed on the ion-exchange resin layer, wherein gaps are provided between metal particles in the metal particle layer, wherein a maximum length a (nm) in a horizontal direction of the metal particle, a maximum length b (nm) in a perpendicular direction of the metal particle, and a length c (nm) in the perpendicular direction of a portion embedded into the ion-exchange resin layer of the metal particle satisfy $1.5\ \text{nm} \leq a \leq 200\ \text{nm}$, $b/a \geq 1.25$, and $c \geq 0$ in a cross-sectional surface of the metallic member, and wherein an inclination $\theta$ (°) of the metal particle with respect to a bottom surface of the ion-exchange resin layer satisfies $60° \leq \theta \leq 90°$ in the cross-sectional surface of the metallic member.

(2) The metallic member according to (1), wherein a metal of the metal particle is one or more metals selected from Ag, Al, Au, Ti, Cr, Mn, Fe, Ni, Cu, Zn, Zr, Nb, Mo, In, Co, and Sn.

(3) The metallic member according to (2), wherein the metal of the metal particle is Ag.

(4) The metallic member according to any of (1) to (3), wherein an ion-exchange resin of the ion-exchange resin layer is a resin with a carboxyl group and/or a sulfo group.

(5) The metallic member according to (4), wherein the ion-exchange resin of the ion-exchange resin layer is polyamic acid.

(6) The metallic member according to any of (1) to (5), wherein at least a part of a surface of the metal particle is coated with a polymer for adsorbing to a metal surface.

(7) The metallic member according to (6), wherein a weight average molecular weight of the polymer for adsorbing to a metal surface is from 10000 to 360000.

(8) The metallic member according to (6) or (7), wherein the polymer for adsorbing to a metal surface is at least one selected from a polyvinyl-based polymer, a polyethylene glycol-based polymer, and a polyacrylic acid-based polymer.

(9) A method for manufacturing the metallic member according to any of (1) to (8), comprising: forming an ion-exchange resin layer on a surface of a substrate body; treating the ion-exchange resin layer with a solution containing metal ions to introduce the metal ions to the ion-exchange resin layer; and treating the ion-exchange resin layer to which the metal ions are introduced with a solution containing 0.5 mM to 500 mM of a polymer for adsorbing to a metal surface and 0.01 mM to 10 mM of a reducing agent to reduce the metal ions and deposit metal particles on a surface of the ion-exchange resin layer.

The present disclosure can provide the radio wave transmissive metallic member excellent in metallic luster.

DETAILED DESCRIPTION

Embodiments of the present disclosure will be described in detail below.

The present disclosure relates to a metallic member comprising a substrate body with an ion-exchange resin layer on a surface and a metal particle layer formed on the ion-exchange resin layer side of the substrate body. That is, the metallic member of the present disclosure comprises a substrate body, an ion-exchange resin layer formed on the substrate body, and a metal particle layer formed on the ion-exchange resin layer.

Figure 1A:
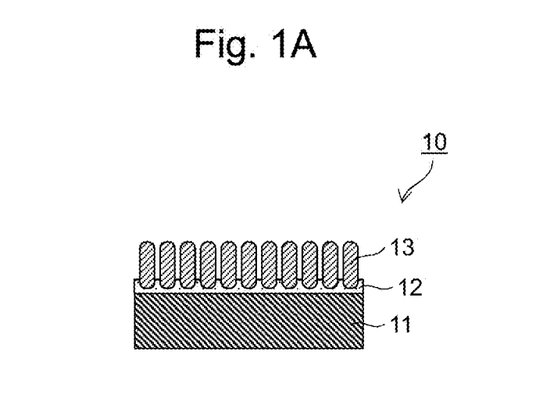
FIG. 1A illustrates a schematic cross-sectional view of one embodiment of a metallic member of the present disclosure.

FIG. 1A illustrates a schematic cross-sectional view of one embodiment of a metallic member of the present disclosure. As illustrated in FIG. 1A, a metallic member 10 comprises a substrate body 11, an ion-exchange resin layer 12 formed on the substrate body 11, and a layer of metal particles 13 formed on the ion-exchange resin layer 12. That is, in the metallic member 10, the substrate body 11, the ion-exchange resin layer 12, and the layer of the metal particles 13 are stacked in this order from the lower side. In some embodiments, the metallic member 10 comprises the substrate body 11, the ion-exchange resin layer 12 directly stacked on the substrate body 11, and the layer of the metal particles 13 directly stacked on the ion-exchange resin layer 12. In the metal particle layer, there are gaps between the metal particles. The metallic member may comprise the ion-exchange resin layer and the metal particle layer on both surfaces of the substrate body.

The substrate body is not especially limited, and a substrate film, a resin molded product substrate, a glass substrate, and articles to be provided with metallic luster can be used as the substrate body.

As the substrate film, for example, a resin film can be used. As the resin film, a transparent film may be used, examples of the transparent film include polyethylene terephthalate, polycarbonate, polymethyl methacrylate, and acrylic, and polycarbonate and acrylic are used in some embodiments. As the resin film, a resin with a group convertible into an ion exchange group such as a carboxyl group and/or a sulfo group may be used. Examples of such a resin include polycarbonate, acrylic, polyimide, and polystyrene, and polyimide with a high functional group density is used in some embodiments.

Examples of the resin molded product substrate include a resin for an automobile emblem. Examples of the articles to be provided with metallic luster include a door knob of an automobile provided with a smart key, a mobile phone housing, a personal computer housing, and a refrigerator.

The thickness of the substrate body is ordinarily from 10 μm to 10 mm, and may be from 10 μm to 5 mm.

The ion-exchange resin layer is formed on a surface of the substrate body. The ion-exchange resin only needs to have an ion exchange group ion-exchangeable with metal ions, and for example, a resin with a carboxyl group and/or a sulfo group can be used. As the ion-exchange resin, polyamic acid and a styrene-divinylbenzene copolymer may be used, and polyamic acid is used in some embodiments. In the ion-exchange resin, the ion exchange group may be converted to any form by heating process or the like. For example, polyamic acid is dehydrated by a heating process, and converted to polyimide.

The thickness of the ion-exchange resin layer is ordinarily from 0.5 μm to 10 μm, and may be from 0.7 μm to 1.5 μm.

The metal particle layer is formed on a surface of the ion-exchange resin layer. As the metal of the metal particles, Ag, Al, Au, Ti, Cr, Mn, Fe, Ni, Cu, Zn, Zr, Nb, Mo, In, Co, and Sn may be used, and in terms of having the high luminance, Ag, Al, and Cr may be used, and Ag is used in some embodiments.

In the metal particle layer, the metal particles are formed in, for example, island shapes, and there are gaps between the metal particles. That is, the metal particle layer is a discontinuous film of the metal particles. While it is only necessary that the gaps between the metal particles are provided between at least a part of the metal particles, the gaps are provided between the respective metal particles in some embodiments. The gaps between the metal particles are ordinarily from 1 nm to 1000 nm, and may be from 1 nm to 100 nm. The gaps between the metal particles mean an average length obtained by randomly extracting, for example, 100 metal particles from a surface image of the metallic member obtained by a field emission scanning electron microscope (FE-SEM) (50000×), drawing straight lines on the centers of adjacent particles, and measuring linear gaps using image analysis software ImageJ. The gaps between the metal particles provide the metallic member with the excellent radio wave transparency.

In the metallic member of the present disclosure, the metal particles having the high aspect ratio are longitudinally oriented with respect to the ion-exchange resin layer and the substrate body. This allows the absorption peak due to the surface plasmon resonance to be shifted, thereby allowing obtaining a metal film having a tone and a luster originally provided in the metal without peculiar absorption in the visible light region.

Figure 1B:
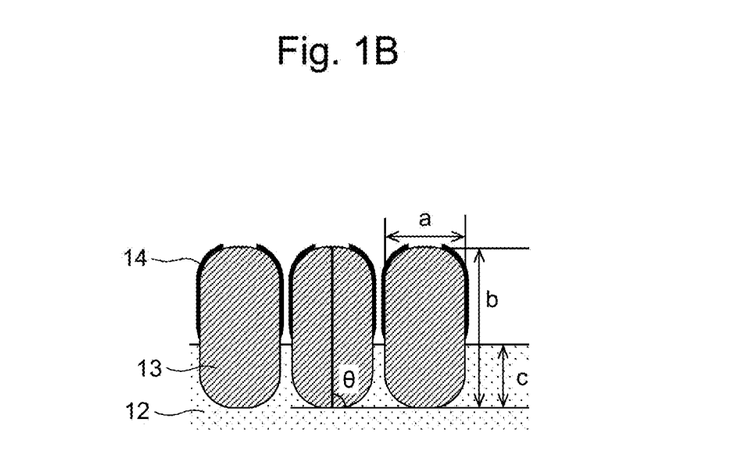
FIG. 1B illustrates a partially enlarged schematic cross-sectional view of one embodiment of the metallic member of the present disclosure.

FIG. 1B illustrates a partially enlarged schematic cross-sectional view of one embodiment of the metallic member of the present disclosure. As illustrated in FIG. 1B, in one embodiment, the metal particles 13 are embedded into the ion-exchange resin layer 12. The metal particles 13 have the high aspect ratio, and are longitudinally oriented with respect to the ion-exchange resin layer 12 and the substrate body (not illustrated). In one embodiment, the surface of the metal particle 13 is partially coated with a polymer 14 for adsorbing to a metal surface. In FIG. 1B, a indicates the maximum length (nm) in the horizontal direction of the metal particle, b indicates the maximum length (nm) in the perpendicular direction of the metal particle, and c indicates a length (nm) in the perpendicular direction of the portion embedded into the ion-exchange resin layer of the metal particle. In FIG. 1B, θ indicates an inclination (°) of the metal particle with respect to the bottom surface of the ion-exchange resin layer.

In the metallic member of the present disclosure, the longitudinal orientation of the metal particles having the high aspect ratio with respect to the ion-exchange resin layer and the substrate body is indicated using a ratio b/a of the maximum length b (nm) in the perpendicular direction to the maximum length a (nm) in the horizontal direction of the metal particle and the inclination θ (°) of the metal particle.

The maximum length a in the horizontal direction of the metal particle is the maximum length in the horizontal direction with respect to the surface of the ion-exchange resin layer and the surface of the substrate body. The maximum length b in the perpendicular direction of the metal particle is the maximum length in the perpendicular direction with respect to the surface of the ion-exchange resin layer and the surface of the substrate body. Note that, since the metal particle may be inclined with respect to the bottom surface of the ion-exchange resin layer by the inclination θ (°), the perpendicular direction means not only the direction of 90° with respect to the surface of the ion-exchange resin layer and the surface of substrate body, and may be the direction of from 60° to 90° corresponding to the inclination θ (°).

The maximum length a in the horizontal direction and the maximum length b in the perpendicular direction of the metal particle can be determined by obtaining a cross-sectional image of the metallic member by a scanning transmission electron microscope (STEM), randomly extracting, for example, 100 particles present in the visual field of 50000 times, calculating the lengths using the image analysis software ImageJ, and obtaining the average value (number average). The maximum length a in the horizontal direction of the metal particle can be determined also by obtaining a surface image of the metallic member by a field emission scanning electron microscope (FE-SEM) (50000×) and obtaining the average value (number average) of the maximum diameters of the particles. Note that the maximum length a in the horizontal direction of the metal particle is considered to have the same value in both measurements with STEM and FE-SEM.

The maximum length a (nm) in the horizontal direction of the metal particle is $1.5 \text{ nm} \leq a \leq 200$ nm. With the length a in the range, the metal particles can reflect a visible light and allows transmission of the millimeter wave, thus being provided with the radio wave transparency. The length a (nm) may be $5 \text{ nm} \leq a \leq 150$ nm, $5 \text{ nm} \leq a \leq 100$ nm in some embodiments, and $5 \text{ nm} \leq a \leq 50$ nm in some embodiments.

The maximum length b (nm) in the perpendicular direction of the metal particle may be $1.9 \text{ nm} \leq b \leq 500$ nm, and $10 \text{ nm} \leq b \leq 100$ nm in some embodiments. With the length b in the range, a metal film having a tone and a luster originally provided in the metal can be obtained.

The ratio b/a (also referred to as an aspect ratio) of the maximum length b in the perpendicular direction to the maximum length a in the horizontal direction of the metal particle is $b/a \geq 1.25$, may be $b/a \geq 1.5$, and $b/a \geq 2.0$ in some embodiments. When the aspect ratio b/a of the metal particle is 1.25 or more, the absorption of the specific wavelength in the visible light region can be suppressed by shifting the absorption peak due to the surface plasmon resonance, thus allowing obtaining a metal film having a tone and a luster originally provided in the metal without peculiar absorption in the visible light region.

The length c (nm) in the perpendicular direction of the portion embedded into the ion-exchange resin layer of the metal particle is $c \geq 0$. That is, the metal particle is in contact with the surface of the ion-exchange resin layer (c=0), or partially embedded into the ion-exchange resin layer (c>0). In terms of having the high durability, the length c (nm) is c>0 in some embodiments. The length c (nm) is smaller than the maximum length b (nm) in the perpendicular direction of the metal particle (c<b), may be c<50 nm, c<25 nm in some embodiments, and c<10 nm in some embodiments. Similarly to the length a and the length b, the length c of the metal particle can be determined by obtaining a cross-sectional image of the metallic member by a scanning transmission electron microscope (STEM), randomly extracting particles present in the visual field of 50000 times, and using the image analysis software ImageJ. As illustrated in FIG. 1B, the metal particle is in contact with the surface of the ion-exchange resin layer at both ends of the metal particle. The length c of the metal particle can be obtained by calculating each of the lengths in the perpendicular direction (90°) from a straight line passing through the bottom surfaces of the particles in the ion-exchange resin layer to both ends in contact with the surface of the ion-exchange resin layer of the particles in the cross-sectional image, and obtaining the average value (number average) of, for example, 25 to 50 particles.

The inclination θ (°) of the metal particle with respect to the bottom surface (that is, surface in the substrate body side) of the ion-exchange resin layer is $60° \leq θ \leq 90°$, may be $75° \leq θ \leq 90°$, and $80° \leq θ \leq 90°$ in some embodiments. With the inclination θ of the metal particle in the range, the metal film can have the tone and the luster originally provided in the metal.

Similarly to the measurement of the length of the metal particle, the inclination θ of the metal particle can be obtained by analyzing a TEM image obtained by STEM using ImageJ, randomly extracting, for example, 100 particles present in the visual field of 50000 times, and calculating an angle between the central axis in the perpendicular direction of the metal particle and the bottom surface of the ion-exchange resin layer. The central axis in the perpendicular direction of the metal particle corresponds to the maximum length b in the perpendicular direction of the metal particle.

The structure in which the metal particles having the high aspect ratio are longitudinally oriented can be obtained by using a polymer for adsorbing to a metal surface in a method for manufacturing a metallic member described below. Accordingly, at least a part of the surface of the metal particle may be coated with the polymer for adsorbing to a metal surface. Since the polymer for adsorbing to a metal surface adsorb to a specific crystal plane of the metal, usually, a part of the surface of the metal particle is coated with the polymer.

In terms of the high adsorption to the metal surface, a weight average molecular weight of the polymer for adsorbing to the metal surface may be 10000 to 360000, and 10000 to 100000 in some embodiments.

As the polymer for adsorbing to the metal surface, for example, a polymer having a lone electron pair of nitrogen (N), sulfur (S), or oxygen (O) in a molecular chain structure of the polymer can be used, and a polymer having a lone electron pair of oxygen is used in some embodiments. Since a metal has crystal planes mutually different in atomic packing factor, the electron states on the crystal surfaces are mutually different. In the manufacture of the metallic member, the polymer having the lone electron pair of N, S, or O adsorbs to a specific crystal plane of the metal via the electrons of the lone electron pair, thereby allowing controlling the aspect ratio and the inclination of the metal particles.

The polymer for adsorbing to the metal surface is not especially limited, and examples of the polymer include: a polyvinyl-based polymer such as polyvinyl acetate, polyvinyl alcohol, poly-N-vinylacetamide, and polyvinylpyrrolidone; a polyethylene glycol-based polymer such as polyethylene glycol, polyepichlorohydrin, and polyepibromohydrin; a polyacrylic acid-based polymer such as polyacrylic acid, polymethacrylic acid, sodium polyacrylate, and sodium polymethacrylate; and poly(amidoamine) dendrimer synthesized by alternately adding ethylenediamine and methyl acrylate. Among them, the polyvinyl-based polymer, the polyethylene glycol-based polymer, and the polyacrylic acid-based polymer may be used, polyvinyl alcohol, polyvinylpyrrolidone, polyethylene glycol, and sodium polyacrylate are used in some embodiments, and polyvinylpyrrolidone is used in some embodiments.

The metallic member has an L* value of 75 or more in some embodiments, thus having a high luminance. The L* value of the metallic member can be determined by, for example, performing a measurement of SCI method (including regular reflection light) using a spectrophotometer, obtaining a spectral reflectance R ($\lambda$) from a ratio between a spectral radiant flux having a wavelength $\lambda$ reflected by an object and a spectral radiant flux having a wavelength $\lambda$ reflected by a perfect reflecting diffuser (Japanese Industrial Standard Z 8722), and calculating an index value L* of a color system of CIE1976 (L*, a*, b*) specified by International Commission on Illumination (CIE) using the spectral reflectance R ($\lambda$).

The metallic member has an a* value of from −2 to 2 in some embodiments, and less changes in the tone to the color phases of red and green. The a* value of the metallic member can be measured similarly to the L* value.

The metallic member has an b* value of from −5 to 6 in some embodiments, and less changes in the tone to the color phases of yellow and blue. The b* value of the metallic member can be measured similarly to the L* value.

The metallic member has the a* value of from −2 to 2 and the b* value of from −5 to 6 in some embodiments. When the metallic member has the a* value and the b* value of the ranges, the metal film has the tone and the luster originally provided in the metal, and has the excellent metallic luster.

The present disclosure also relates to a method for manufacturing the metallic member. The method for manufacturing the metallic member of the present disclosure comprises: forming an ion-exchange resin layer on a surface of a substrate body (Step 1); treating the ion-exchange resin layer with a solution containing metal ions to introduce the metal ions to the ion-exchange resin layer (Step 2); and treating the ion-exchange resin layer to which the metal ions are introduced with a solution containing a polymer for adsorbing to a metal surface and a reducing agent to reduce the metal ions and deposit metal particles on a surface of the ion-exchange resin layer (Step 3).

In Step 1, the ion-exchange resin layer is formed on the surface of the substrate body. As the substrate body, those described for the metallic member can be used.

In Step 1, the ion-exchange resin layer can be formed by, for example, applying a solution containing an ion-exchange resin (hereinafter also referred to as an ion-exchange resin solution) over the substrate body surface, and drying the solution to remove the solvent. Applying the ion-exchange resin solution over the substrate body surface is not especially limited, and can be performed by a known application method, for example, nozzle flowing, spraying, dipping, rolling, spinning, and the like can be employed. In one embodiment, when the rolling method is used, a microgravure coater and a doctor knife coater can be used.

It is only necessary to apply the ion-exchange resin solution over the substrate body surface under a condition in which the ion-exchange resin layer having a desired thickness is formed.

It is only necessary to dry the ion-exchange resin solution applied over the substrate body surface under a condition in which the solvent is sufficiently removed, and the drying is performed usually at 10° C. to 120° C. for 0.5 hours to four hours.

In another embodiment, the ion-exchange resin layer can be formed by modifying the substrate body surface. In this embodiment, as the substrate body, a resin film with a group convertible into an ion exchange group can be used. As such a resin film, a resin film with a hydrolysable functional group, to which the ion exchange group can be introduced by hydrolysis, can be used. For such a resin film, a resin with a group convertible into a carboxyl group and/or a sulfo group by hydrolysis can be used, examples of the resin include polycarbonate, acrylic, and polyimide, and polyimide having a high functional group density is used in some embodiments. When polyimide is used, a layer of polyamic acid (also referred to as polyamide acid) with the carboxyl group as the ion exchange group is formed on the surface by hydrolysis. Polystyrene also can be used as the resin film, and for example, by sulfonation of the surface with concentrated sulfuric acid, a layer with the sulfo group can be formed on the surface.

In Step 2, the ion-exchange resin layer is treated with a solution containing metal ions (hereinafter also referred to as a metal ion solution). With this treatment, the ion exchange groups in the ion-exchange resin layer are replaced with metal ions by the ion exchange, and the metal ions are introduced to the ion-exchange resin layer. The ion exchange groups need not be completely replaced with the metal ions, and a part of the ion exchange groups may remain as the ion exchange group.

The metal ions are not especially limited, and are ions of the metals described above for the metallic member. Examples of the metal ions are ions of Ag, Al, Au, Ti, Cr, Mn, Fe, Ni, Cu, Zn, Zr, Nb, Mo, In, Co, and Sn, and in terms having a high luminance, the metal ions may be ions of Ag, Al, and Cr, and ions of Ag in some embodiments.

The metal ion solution only needs to be a solution containing the metal ions. The metal ion solution is not especially limited, and a salt solution of the metal ions can be used. Examples of the salt include nitrate, sulfate, chloride, carbonate, acetate, and phosphate.

The concentration of the metal ion solution is ordinarily from 1 mM (mmol/l) to 500 mM, and may be from 50 mM to 150 mM.

The treatment with the metal ion solution can be performed by, for example, immersing the substrate body including the ion-exchange resin layer formed on the surface in the metal ion solution. For the treatment condition with the metal ion solution, the treatment temperature may be from 10° C. to 50° C., and from 20° C. to 30° C. in some embodiments. The treatment period may be from 1 minute to 60 minutes, and from 15 minutes to 45 minutes in some embodiments.

In Step 3, the ion-exchange resin layer to which the metal ions are introduced is treated with a solution containing a polymer for adsorbing to a metal surface and a reducing agent. With this treatment, the metal ions are reduced to a metal, and the metal particles are deposited on the surface of the ion-exchange resin layer. Since the metal ions are diffused on the surface of the ion-exchange resin layer in which the reducing agent is present, and reduced to the metal, the metallic member to be obtained comprises the substrate body, the ion-exchange resin layer formed on the substrate body, and the metal particle layer formed on the ion-exchange resin layer. In one embodiment, at least a part of the surface of the metal particle is coated with the polymer for adsorbing to a metal surface.

In Step 3, by using the polymer for adsorbing to a metal surface together with the reducing agent, the metal particles having the high aspect ratio can be longitudinally oriented with respect to the ion-exchange resin layer and substrate body. By using the polymer for adsorbing to a metal surface, at least a part of the surface of the metal particle is coated with the polymer, thus allowing the metal particles to be protected by the polymer. Therefore, for example, when a resin layer or the like for protecting the metal particles is disposed, a pretreatment is not required, thus enabling reducing the number of steps.

The polymer for adsorbing to a metal surface are as described above for the metallic member.

The concentration of the polymer for adsorbing to a metal surface in the solution containing the polymer and the reducing agent is from 0.1 mM to 500 mM, and may be from 0.1 mM to 30 mM. When the concentration of the polymer for adsorbing to a metal surface is 0.1 mM or more, the aspect ratio of the metal particle can be controlled within the specific range of the present disclosure, and the metal film has the excellent metallic luster. When the concentration of the polymer for adsorbing to a metal surface is 500 mM or less, the metal ions can be reliably reduced to the metal particles.

The reducing agent is not especially limited, and examples of the reducing agent include a phosphoric acid-based compound, a borohydride compound, and a hydrazine derivative. Examples of the phosphoric acid-based compound include hypophosphorous acid, phosphorous acid, pyrophosphoric acid, and polyphosphoric acid. Examples of the borohydride compound include methylhexaborane, dimethylamine borane, diethylamine borane, morpholine borane, pyridinamine borane, piperidine borane, ethylenediamine borane, ethylenediamine-bis borane, t-butylamine borane, imidazole borane, methoxyethylamine borane, and sodium borohydride. As the hydrazine derivative, hydrazine salt such as hydrazine sulphate and hydrazine hydrochloride, and a hydrazine derivative such as pyrazoles, triazoles, and hydrazides can be used. Among them, as the pyrazoles, a pyrazole derivative such as 3,5-dimethylpyrazole and 3-methyl-5-pyrazolone can be used in addition to pyrazole. As the triazoles, 4-amino-1,2,4-triazole, 1,2,3-triazole, and the like can be used. As the hydrazides, adipic acid hydrazide, maleic hydrazide, carbohydrazide, and the like can be used. The reducing agent is dimethylamine borane (DMAB) in some embodiments.

The concentration of the reducing agent in the solution containing the polymer for adsorbing to a metal surface and the reducing agent is from 0.01 mM to 10 mM, and may be from 0.1 mM to 5 mM. When the concentration of the reducing agent is 0.01 mM or more, the sticking force of the metal particles to the ion-exchange resin layer increases, thus increasing the durability and the wear resistance. When the concentration of the reducing agent is 10 mM or less, the metal particle layer can be formed as a discontinuous film provided with gaps between the metal particles, thereby providing the metal film with the excellent radio wave transparency.

A molar concentration ratio (reducing agent: polymer) between the reducing agent and the polymer for adsorbing to a metal surface in the solution containing the polymer and the reducing agent is ordinarily from 1:0.01 to 1:50000, and may be from 1:0.05 to 1:500.

The treatment with the solution containing the polymer for adsorbing to a metal surface and the reducing agent can be performed by, for example, immersing the substrate body including the ion-exchange resin layer on the surface in the solution. For the treatment condition, the treatment temperature is ordinarily from 10° C. to 60° C., and may be from 25° C. to 50° C. The treatment period is ordinarily from 10 seconds to 60 minutes, and may be from 30 seconds to 30 minutes. By adjusting the treatment temperature and the treatment period corresponding to the reducing capacity of the reducing agent, the metal film in which gaps are provided between the deposited metal particles and the metal particles have a predetermined length can be obtained.

The treatment with the solution containing the polymer for adsorbing to a metal surface and the reducing agent may be performed while stirring the solution. In the treatment, by changing the stirring speed of the solution, the inclination θ of the metal particle can be adjusted. Specifically, when the stirring speed of the solution is high, the particles grow in the direction along the flow, and the inclination θ of the metal particle tends to be decreased. Accordingly, the treatment with the solution containing the polymer for adsorbing to a metal surface and the reducing agent can be performed while stirring the solution such that the inclination θ of the metal particle becomes 60°≤θ≤90°. In one embodiment, when the solution containing the polymer and the reducing agent is stirred using a stirrer, the rotation speed of from 0 rpm to 1250 rpm (may be 0 rpm to 500 rpm) allows the inclination θ of the metal particle to be 60°≤θ≤90°. In some embodiments, when the solution containing the polymer and the reducing agent is stirred using a stirrer, the rotation speed of from 0 rpm to 300 rpm allows the inclination θ of the metal particle to be 80°≤θ≤90°. The stirring condition of the solution can be appropriately selected so as to achieve the intended inclination θ of the metal particle in also considering other treatment conditions.

The method for manufacturing the metallic member of the present disclosure may further comprise Step 4 for performing a heating process after Step 3. With this process, the ion-exchange resin layer can be converted to any form. In one embodiment, when the ion-exchange resin contains the carboxyl group and/or the sulfo group, these groups are dehydrated by performing the heating process. For example, polyamic acid is converted to polyimide by the heating process. The temperature of the heating process is ordinarily from 100° C. to 300° C.

With the radio wave transparency and the excellent metallic luster, the metallic member of the present disclosure can be appropriately used as a metallic member for a product requiring the radio wave transparency.

EXAMPLES

The present disclosure will be described more specifically using examples below. However, the technical scope of the present disclosure is not limited to these examples.

Example 1

250 μL of a polyamic acid solution (manufactured by I.S.T, Pyre-M.L. (registered trademark) RC-5019) was spincoated over a surface of a polycarbonate (PC) film (thickness 400 μm, manufactured by SUMIKA ACRYL, TECHNOLLOY (registered trademark) C000) under a condition of 1000 rpm for 15 seconds and subsequently 3000 rpm for 60 seconds, and vacuum-dried at 40° C. for one hour, thereby forming a polyamic acid layer on the surface of the polycarbonate film.

Silver nitrate ($AgNO_3$) (manufactured by NACALAI TESQUE, 31018-14) was dissolved in pure water, thereby preparing 100 mM of an $AgNO_3$ solution. After water-washing the film surface, the film was immersed in the $AgNO_3$ solution at room temperature for 30 minutes, thereby introducing Ag ions to the polyamic acid layer by ion exchange.

Dimethylamine borane (DMAB) (manufactured by Wako, 028-08401) was dissolved in pure water, and polyvinylpyrrolidone (PVP) having the weight average molecular weight of 10000 was added to the solution and mixed, thereby preparing a mixed solution of 1.5 mM of DMAB and 0.1 mM of PVP. A stirrer was put in the mixed solution of DMAB and PVP, the film was immersed in the mixed solution at 30° C. for 10 minutes while stirring the mixed solution at a rotation speed of 200 rpm, Ag ions were reduced and Ag particles were deposited on the surface of the polyamic acid layer, subsequently, the film was water-washed and dried, thus obtaining a metallic member.

Example 2

A metallic member of Example 2 was obtained similarly to Example 1 except that the PVP concentration in the mixed solution of DMAB and PVP was changed to 1.0 mM.

Example 3

A metallic member of Example 3 was obtained similarly to Example 1 except that the PVP concentration in the mixed solution of DMAB and PVP was changed to 5.0 mM.

Example 4

A metallic member of Example 4 was obtained similarly to Example 1 except that the PVP concentration in the mixed solution of DMAB and PVP was changed to 500 mM.

Example 5

A metallic member of Example 5 was obtained similarly to Example 3 except that the DMAB concentration in the mixed solution of DMAB and PVP was changed to 0.01 mM.

Example 6

A metallic member of Example 6 was obtained similarly to Example 3 except that the DMAB concentration in the mixed solution of DMAB and PVP was changed to 0.05 mM.

Example 7

A metallic member of Example 7 was obtained similarly to Example 3 except that the DMAB concentration in the mixed solution of DMAB and PVP was changed to 10 mM.

Example 8

A metallic member of Example 8 was obtained similarly to Example 3 except that the weight average molecular weight of PVP was changed to 40000.

Example 9

A metallic member of Example 9 was obtained similarly to Example 3 except that the weight average molecular weight of PVP was changed to 360000.

Example 10

A metallic member of Example 10 was obtained similarly to Example 3 except that the rotation speed of the mixed solution of DMAB and PVP when the film was immersed in the mixed solution was changed to 1000 rpm to change the inclination θ of the metal particle to 75°.

Example 11

A metallic member of Example 11 was obtained similarly to Example 3 except that the rotation speed of the mixed solution of DMAB and PVP when the film was immersed in the mixed solution was changed to 1250 rpm to change the inclination θ of the metal particle to 60°.

Comparative Example 1

A metallic member of Comparative Example 1 was obtained similarly to Example 1 except that the mixed solution of DMAB and PVP was changed to a DMAB solution.

Comparative Example 2

A metallic member of Comparative Example 2 was obtained similarly to Example 1 except that the PVP concentration in the mixed solution of DMAB and PVP was changed to 5000 mM.

Comparative Example 3

A metallic member of Comparative Example 3 was obtained similarly to Example 3 except that the DMAB concentration in the mixed solution of DMAB and PVP was changed to 100 mM.

Comparative Example 4

A metallic member of Comparative Example 4 was obtained similarly to Example 3 except that the rotation speed of the mixed solution of DMAB and PVP when the film was immersed in the mixed solution was changed to 1500 rpm to change the inclination θ of the metal particle to 55°.

The measurements below were performed for the metallic members of Examples 1 to 11 and Comparative Examples 1 to 4.

Color Difference Measurement

L*, a*, and b* were measured as follows. A spectral reflectance R (λ) was obtained from a ratio between a spectral radiant flux having a wavelength λ reflected by an object and a spectral radiant flux having a wavelength λ reflected by a perfect reflecting diffuser (JIS Z 8722). As a spectrophotometer, CMS-35SP manufactured by MURAKAMI COLOR RESEARCH LABORATORY CO., LTD. was used, and the measurement was performed by SCI method (including regular reflection light).

Each of index values L*, a*, b* of a color system of CIE1976 (L*, a*, b*) specified by International Commission on Illumination (CIE) was calculated using the calculated spectral reflectance R (λ). Here, the L* value is an index indicating a brightness of a color. The larger L* value indicates that the color is brighter. The a* value is an index indicating an intensity of a color to the color phases of red and green. The larger a* value (positive value) indicates the color phase of red, and the smaller a* value (negative value) indicates the color phase of green. The b* value is an index indicating an intensity to the color phases of yellow and blue. The larger b* value (positive value) indicates the color phase of yellow, and the smaller b* value (negative value) indicates the color phase of blue.

Absorption Spectrum Measurement

The absorption spectra were measured in the visible light region of 380 nm to 780 nm using a formula: absorptance (%)=100%−(transmittance (%)+reflectance (%)). The absorption spectra were measured with a spectral bandwidth of 2 nm and a wavelength scan speed of 1000 nm/minute using a spectrophotometer (manufactured by Shimadzu Corporation, UV-3600i Plus). The transmittance was measured with the spectrophotometer set in the opposite side of the light source (via sample), and the reflectance was measured with the spectrophotometer set in the light source side.

Metal Particle Lengths a, b

The maximum length a (nm) in the horizontal direction and the maximum length b (nm) in the perpendicular direction of Ag particle were measured using a scanning transmission electron microscope (STEM) as follows. Specifically, an image of a cross-sectional surface of a metallic member was obtained by a scanning transmission electron microscope (manufactured by JEOL Ltd., JEM-ARM300F), 100 particles present in the visual field of 50000 times were randomly extracted, outer edges of the respective particles were enclosed in oval shapes, the maximum lengths a (nm) in the horizontal direction and the maximum lengths b (nm) in the perpendicular direction were calculated using image analysis software ImageJ, and the average values were obtained.

Length c of Embedded Portion of Metal Particle

The length c in the perpendicular direction of the portion embedded into a polyamic acid layer of Ag particle was measured using the scanning transmission electron microscope (STEM) as follows. A surface of the polyamic acid layer was confirmed from a TEM image of a cross-sectional surface of a metallic member, and a straight line passing through both ends in contact with the surface of the polyamic acid layer of the particle was drawn. Note that while the surface of the polyamic acid layer is viewable in the TEM image because the polyamic acid layer and Ag particles are different in contrast, when it is difficult to find the surface, the boundary can be made clear by adjusting the contrast by image processing or detecting N atoms with EDX. Subsequently, a straight line passing through the bottom surfaces of Ag particles in the polyamic acid layer was drawn, and a line was perpendicularly (90°) drawn from the straight line to one end in contact with the surface of the polyamic acid layer of a particle, its length (length c) was measured, and the length was similarly measured for the other end of the particle. This was randomly performed at 50 to 100 positions, and the average value was calculated.

Metal Particle Inclination θ

An angle of the metal particle (Ag particle) to the bottom surface of the ion-exchange resin layer (polyamic acid layer) was measured as an inclination θ of the metal particle. Similarly to the lengths a, b of the metal particle, the TEM image of the cross-sectional surface of the metallic member obtained by the STEM was analyzed using ImageJ, 100 particles present in the visual field of 50000 times were randomly extracted, and the angles between the bottom surface of the polyamic acid layer and central axes in the perpendicular direction of the particles were calculated. Here, the central axis of the particle is an axis drawn so as to pass through the center in the upper portion and the center in the lower portion of the particle, and corresponds to the maximum length b in the perpendicular direction of the metal particle.

3D-TEM

Images of the cross-sectional surface of the metallic member were obtained by rotating the metallic member by one degree for each with a scanning transmission electron microscope (manufactured by Thermo Fisher Scientific, Talos F200X), and a 3D-TEM image was obtained by synthesizing them.

Millimeter-Wave Attenuation Amount

The millimeter-wave attenuation amount of the metallic member was measured, and the millimeter-wave transparency was evaluated. The millimeter-wave attenuation amount was obtained by performing one-way attenuation measurement using a millimeter-wave characteristic measurement device that includes a horn antenna and doubling the obtained measurement value. Specifically, a measurement sample was irradiated with a millimeter wave from the horn antenna on a transmitting side, and an intensity of the millimeter wave that passed through the sample to enter a horn antenna on a receiving side was measured, thus deciding the one-way attenuation. A distance between the horn antennas on the transmitting side and the receiving side was 95 cm. The sample was installed such that an elevation angle with respect to the horn antenna on the transmitting side was 17° and a distance between the sample and the horn antenna on the transmitting side was about 40 mm. The measurement was performed at 77 GHz as an applicable frequency of an on-vehicle millimeter-wave radar.

Figure 2A:
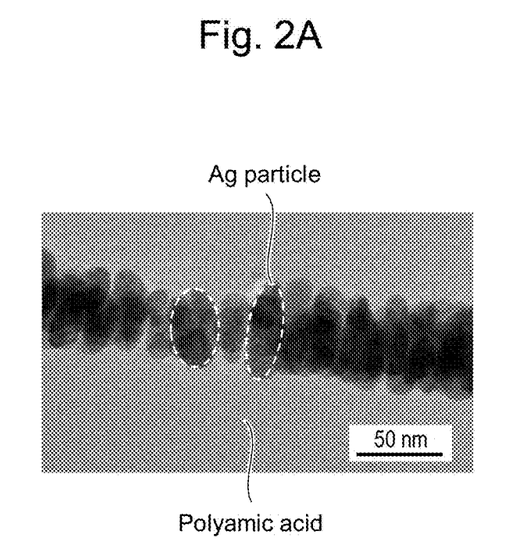
FIG. 2A illustrates a TEM image of a cross-sectional surface of a metallic member of Example 3.
Figure 2B:
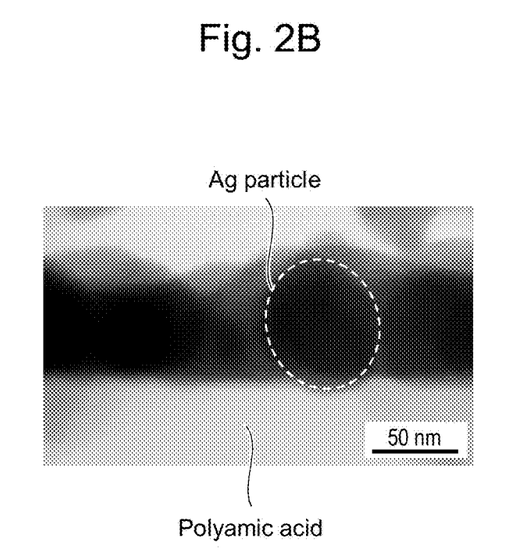
FIG. 2B illustrates a TEM image of a cross-sectional surface of a metallic member of Comparative Example 1.
Figure 3:
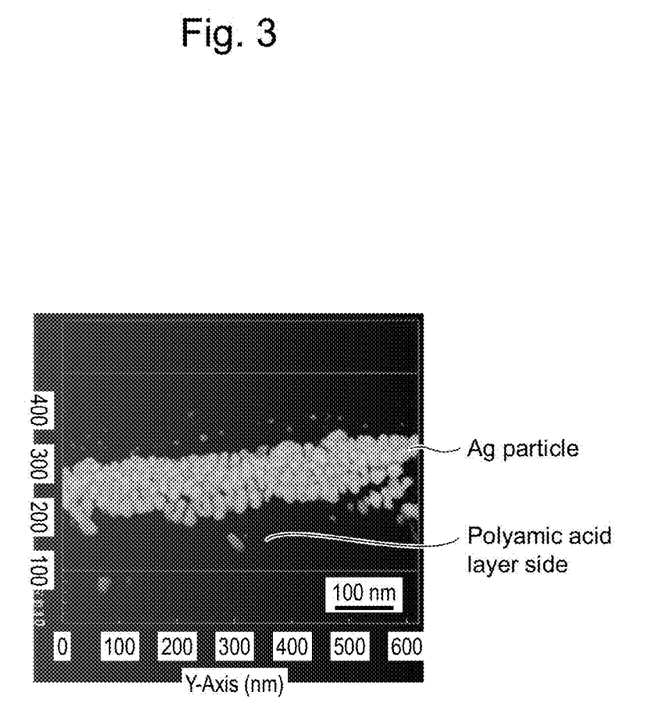
FIG. 3 illustrates a 3D-TEM image of the metallic member of Example 3.

FIG. 2A illustrates a TEM image of a cross-sectional surface of a metallic member of Example 3, and FIG. 2B illustrates a TEM image of a cross-sectional surface of a metallic member of Comparative Example 1. FIG. 3 illustrates a 3D-TEM image of the metallic member of Example 3. As illustrated in FIG. 2A, FIG. 2B, and FIG. 3, in the metallic member of Example 3, Ag particles having the high aspect ratio were longitudinally oriented with respect to the polyamic acid layer and the PC film under the polyamic acid layer compared with the metallic member of Comparative Example 1, and there were gaps between the Ag particles.

Table 1 illustrates the manufacturing conditions and the evaluation results for the metallic members of Examples 1 to 11 and Comparative Examples 1 to 4. In Table 1, the millimeter-wave transparency was determined to be Good when the millimeter-wave attenuation amount was 0.2 dB or less in round-trip, and determined to be Poor when the millimeter-wave attenuation amount was more than 0.2 dB in round-trip. In Table 1, the evaluation was Good when the millimeter-wave transparency was good, 75≤L*, −2<a*<2, and −5<b*≤6 were all satisfied, and the change of the color phase was sufficiently small, and Poor when at least one of these conditions was not satisfied. Note that, in Comparative Example 2, the evaluation was poor because the Ag particle layer was not formed.

from 60° to 90°, the b* value of the metal film is 6 or less, the color phase is less yellowish, and the metal film has the tone and the luster originally provided in the metal.

TABLE 1

|  | DMAB concentration [mM] | PVP concentration [mM] | PVP weight average molecular weight | a [nm] | b [nm] | b/a | c [nm] | θ [°] | L* value | a* value | b* value | Millimeter-wave transparency | Evaluation |
|---|---|---|---|---|---|---|---|---|---|---|---|---|---|
| Example 1 | 1.5 | 0.1 | 10000 | 16 | 20 | 1.25 | 5 | 90 | 76.75 | −0.69 | 0.56 | Good | Good |
| Example 2 | 1.5 | 1.0 | 10000 | 17 | 30 | 1.76 | 6 | 85 | 76.68 | −1.6 | 0.53 | Good | Good |
| Example 3 | 1.5 | 5.0 | 10000 | 17 | 52 | 3.06 | 5 | 80 | 76.38 | −0.09 | 1.71 | Good | Good |
| Example 4 | 1.5 | 500 | 10000 | 18 | 80 | 4.44 | 4 | 90 | 77.24 | −0.05 | 1.9 | Good | Good |
| Example 5 | 0.01 | 5.0 | 10000 | 30 | 62 | 2.07 | 8 | 90 | 77.42 | −1.23 | 0.14 | Good | Good |
| Example 6 | 0.05 | 5.0 | 10000 | 25 | 43 | 1.72 | 7 | 85 | 77.23 | −1.01 | −0.4 | Good | Good |
| Example 7 | 10 | 5.0 | 10000 | 10 | 15 | 1.50 | 3 | 90 | 76.52 | −1.7 | −0.39 | Good | Good |
| Example 8 | 1.5 | 5.0 | 40000 | 19 | 52 | 2.74 | 5 | 85 | 78.58 | −1.62 | 0.74 | Good | Good |
| Example 9 | 1.5 | 5.0 | 360000 | 21 | 57 | 2.71 | 5 | 90 | 75.99 | −1.79 | 1.07 | Good | Good |
| Example 10 | 1.5 | 5.0 | 10000 | 17 | 52 | 3.06 | 5 | 75 | 80.77 | −0.08 | 5.9 | Good | Good |
| Example 11 | 1.5 | 5.0 | 10000 | 17 | 52 | 3.06 | 5 | 60 | 80.26 | 0.05 | 6 | Good | Good |
| Comparative Example 1 | 1.5 | — | — | 50 | 50 | 1.00 | 10 | 90 | 75 | 6.5 | 8 | Good | Poor |
| Comparative Example 2 | 1.5 | 5000 | 10000 | | | | Not Reduced | | | | | Good | Poor |
| Comparative Example 3 | 100 | 5.0 | 10000 | | | Continuous Film | | | 78.25 | −0.22 | 4.41 | Poor | Poor |
| Comparative Example 4 | 1.5 | 5.0 | 10000 | 17 | 52 | 3.06 | 5 | 55 | 80.42 | −1.26 | 7.2 | Good | Poor |

As illustrated in Table 1, in Comparative Example 1 in which PVP was not used, the ratio b/a was b/a<1.25, the a* value of the metal film was 6.5, the b* value was 8, the color phase was reddish and yellowish, and the metal film did not have the tone and the luster originally provided in the metal. On the other hand, in Examples 1 to 11 in which PVP was used, the ratio b/a was b/a≥1.25, the change of the color phase of the metal film was small, the metal film had the tone and the luster originally provided in the metal, and the metal film had the excellent metallic luster. Comparative Examples 1 and Examples 1 to 11 indicate that for obtaining a metal film with little color phase change, it is necessary that PVP for adsorbing to a metal surface is used in the reduction process and the metal particle has the high aspect ratio satisfying b/a≥1.25.

Examples 1 to 4 and Comparative Example 2 indicate that Ag ions are reliably reduced to Ag particles when the PVP concentration in the mixed solution of DMAB and PVP is 0.1 mM to 500 mM (Examples 1 to 4), and the Ag ions are not reduced to Ag particles and the Ag particle layer is not formed when the PVP concentration is 5000 mM (Comparative Example 2). Examples 3, 8, and 9 indicate that the Ag particles have the high aspect ratio and the metal film has the excellent metallic luster when the weight average molecular weight of PVP is in a range from 10000 to 360000.

Example 3, 5 to 7 and Comparative Example 3 indicate that the Ag particle layer is formed as a discontinuous film and the metallic member has the excellent millimeter-wave transparency because the reducing capacity of the reducing agent is in an appropriate range when the DMAB concentration in the mixed solution of DMAB and PVP is 0.01 mM to 10 mM (Examples 3, 5 to 7), and the Ag particle layer is formed as a continuous film and the millimeter-wave transparency of the metallic member is lowered because the reducing capacity of the reducing agent is excessively strong when the DMAB concentration is 100 mM (Comparative Example 3).

Figure 4:
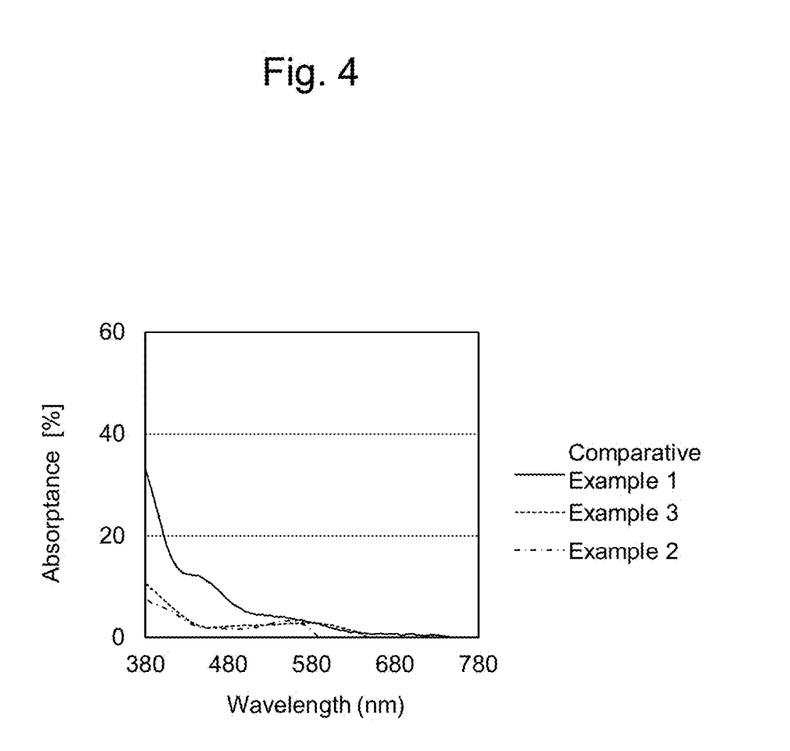
FIG. 4 illustrates absorption spectra of metallic members Examples 2, 3 and Comparative Example 1.

Examples 3, 10, 11 and Comparative Example 4 indicate that when the inclination θ of the metal particle is in a range FIG. 4 illustrates absorption spectra of metallic members Examples 2, 3 and Comparative Example 1. As illustrated in FIG. 4, the metal film intensively absorbs the light having the specific wavelength (380 nm to 480 nm) in the visible light region and the tone of the metal film changes in Comparative Example 1, and the peculiar absorption is not present in the visible light region, the change of the tone of the metal film is small, and the metal film has the tone and the luster originally provided in the metal in the metallic member of Examples 2 and 3.

All publications, patents, and patent applications cited herein are incorporated herein by reference in their entirety.

What is claimed is:

1. A metallic member comprising:
   a substrate body;
   an ion-exchange resin layer formed on the substrate body; and
   a metal particle layer formed on the ion-exchange resin layer,
   wherein gaps are provided between metal particles in the metal particle layer,
   wherein a maximum length a (nm) in a horizontal direction of the metal particle, a maximum length b (nm) in a perpendicular direction of the metal particle, and a length c (nm) in the perpendicular direction of a portion embedded into the ion-exchange resin layer of the metal particle satisfy 1.5 nm≤a≤200 nm, b/a≥1.25, and c≥0 in a cross-sectional surface of the metallic member, and
   wherein an inclination θ (°) of the metal particle with respect to a bottom surface of the ion-exchange resin layer satisfies 60°≤θ≤90° in the cross-sectional surface of the metallic member.

2. The metallic member according to claim 1, wherein a metal of the metal particle is one or more metals selected from Ag, Al, Au, Ti, Cr, Mn, Fe, Ni, Cu, Zn, Zr, Nb, Mo, In, Co, and Sn.

3. The metallic member according to claim 2, wherein the metal of the metal particle is Ag.

4. The metallic member according to claim 1, wherein an ion-exchange resin of the ion-exchange resin layer is a resin with a carboxyl group and/or a sulfo group.

5. The metallic member according to claim 4, wherein the ion-exchange resin of the ion-exchange resin layer is polyamic acid.

6. The metallic member according to claim 1, wherein at least a part of a surface of the metal particle is coated with a polymer for adsorbing to a metal surface.

7. The metallic member according to claim 6, wherein a weight average molecular weight of the polymer for adsorbing to a metal surface is from 10000 to 360000.

8. The metallic member according to claim 6, wherein the polymer for adsorbing to a metal surface is at least one selected from a polyvinyl-based polymer, a polyethylene glycol-based polymer, and a polyacrylic acid-based polymer.

9. A method for manufacturing the metallic member according to claim 1, comprising:
- forming an ion-exchange resin layer on a surface of a substrate body;
- treating the ion-exchange resin layer with a solution containing metal ions to introduce the metal ions to the ion-exchange resin layer; and
- treating the ion-exchange resin layer to which the metal ions are introduced with a solution containing 0.1 mM to 500 mM of a polymer for adsorbing to a metal surface and 0.01 mM to 10 mM of a reducing agent to reduce the metal ions and deposit metal particles on a surface of the ion-exchange resin layer.

* * * * *